Figure 1:
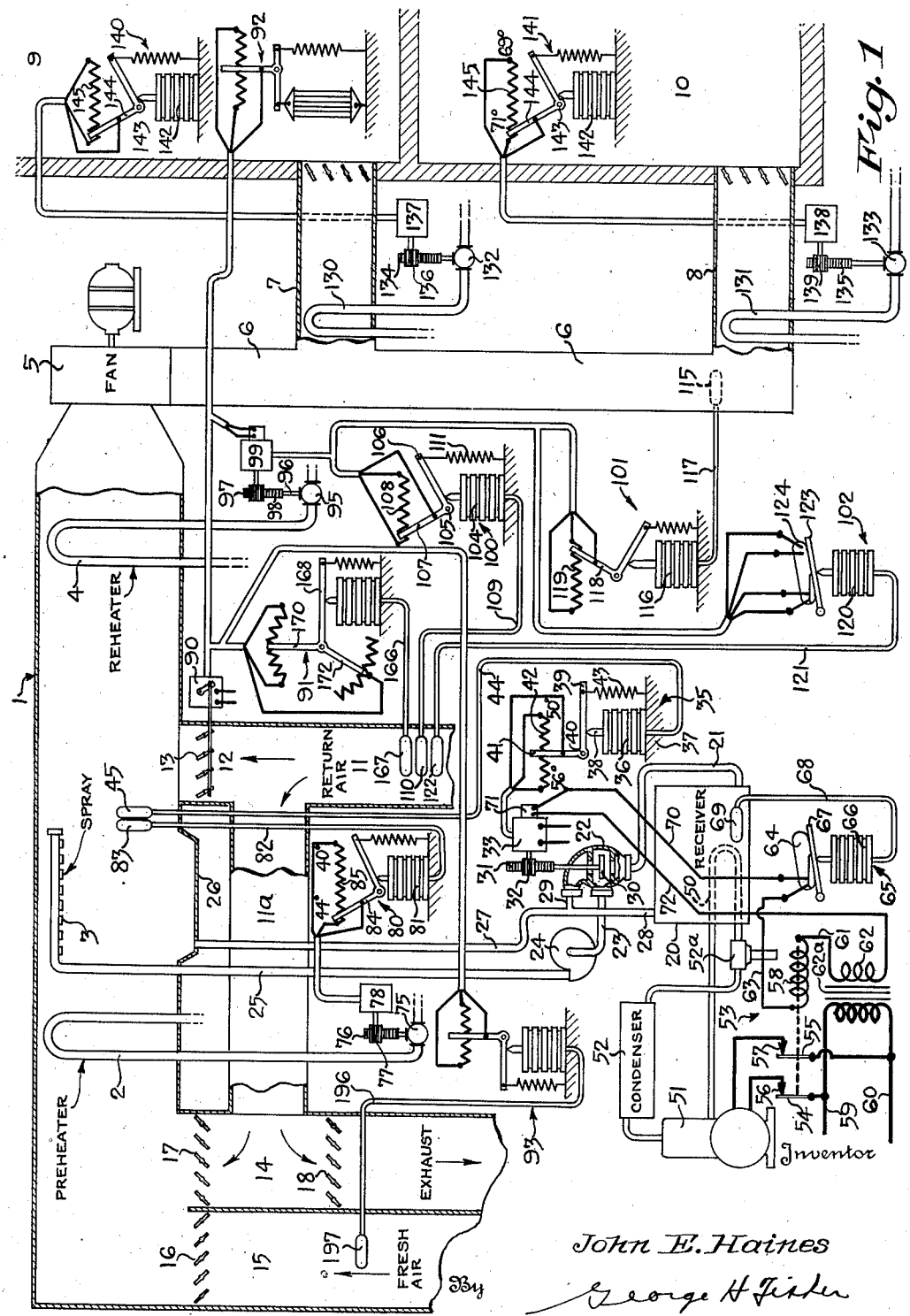

Patented Oct. 15, 1940

2,218,468

UNITED STATES PATENT OFFICE 2,218,468

AIR CONDITIONING SYSTEM

John E. Haines, Minneapolis, Minn., assignor to Minneapolis-Honeywell Regulator Company, Minneapolis, Minn., a corporation of Delaware Application February 23, 1937, Serial No. 127,128

14 Claims. (Cl. 257—3)

This invention relates generally to the art of air conditioning and is more particularly concerned with automatic control arrangements for air condition systems.

The primary object of my invention is to provide a relatively simple and dependable control arrangement for automatically controlling an air conditioning system to maintain desired indoor conditions throughout the entire year, such system effecting control of cooling, control of heating, control of ventilation, control of humidification, and control of dehumidification, these various conditioning functions being utilized in varying degrees and sequence to economically maintain the desired indoor conditions regardless of conditions exterior to the conditioned space.

In accordance with a preferred form of my invention, a conditioning chamber is provided through which a mixture of return air and fresh air is passed to be conditioned, the thereby conditioned air being discharged from such chamber to the spaces to be conditioned. Located within the conditioning chamber is a preheating coil and a spray device around which is placed a by-pass for the return air. The preheater and spray device are controlled by a pair of dew-point controllers which act to maintain the dew-point temperature of the air issuing from the spray within a predetermined range. During the cooling cycle the proportions of the air passed through and by-passed around the spray device are varied by a by-pass damper which damper is controlled by a temperature controller responsive to the temperature of the air within the conditioned space. This controller is in turn compensated for changes in humidity by a humidostat located within the conditioned space to maintain a desired comfort or effective temperature. In addition, the temperature controller is adjusted by an outside temperature responsive controller for varying the inside temperature maintained in accordance with outside temperature. For effecting heating, a reheater is placed in the conditioning chamber downstream of the spray device and the by-pass, and this reheater is controlled by a spaced temperature responsive controller which acts to cause steam to be supplied to the reheating coil when the temperature within the space falls to a predetermined value. At this time the control of the by-pass damper is taken away from the controllers mentioned and the by-pass damper is closed completely to cause all of the air to be passed through the spray device. Also during the heating cycle the temperature of the air in the various zones is controlled by booster heaters for each zone, these booster heaters being controlled by temperature responsive controllers in the respective zones.

One object of my invention is to provide an air conditioning system of the type wherein the air to be conditioned is passed through a spray, with automatic control means for maintaining the temperature of the air issuing from the spray within a predetermined range, such control means acting automatically to operate either heating or cooling devices in the appropriate manner to maintain the desired condition.

Another object of my invention is the provision of a by-pass around an air conditioning device such as a spray with an automatic control device for varying the air passed through and around the spray in accordance with the refrigeration load, such control device acting also to prevent the flow of air through the by-pass when a heater is placed in operation.

A further object is the provision of an air conditioning system in which a spray device is provided with controlling means for maintaining the dew-point of the air within a predetermined range and in which a by-pass is placed around such spray device, the proportions of the air passed through and around the spray device being controlled during the cooling cycle in accordance with the demand for cooling, and in which the by-pass is automatically closed when the heating cycle begins.

A still further object is to provide a year-around air conditioning system in which a low limit controller is located in the discharge duct for preventing the temperature of the air delivered to the conditioned space from falling below a predetermined value during the heating cycle, such low limit controller being automatically placed out of operation during the cooling cycle.

Another object of my invention is to provide a zoned heating system in which the control of a main heating coil for supplying heated air to a plurality of zones is controlled in accordance with the average requirements for heat of all of the zones, and in which the temperature of each individual zone is controlled by means of a temperature controller which controls the supply of heat to a booster heater for that zone.

Another object is the provision of a refrigeration system for supplying a chilled cooling medium to a heat exchanger, in which the flow of cooling medium is controlled in accordance with the cooling requirements and in which the operation of a refrigeration system is stopped whenever the flow of cooling medium is reduced to a predetermined value.

Further objects and advantages of my invention will appear from the following detailed description and from the appended claims.

Figure 2:
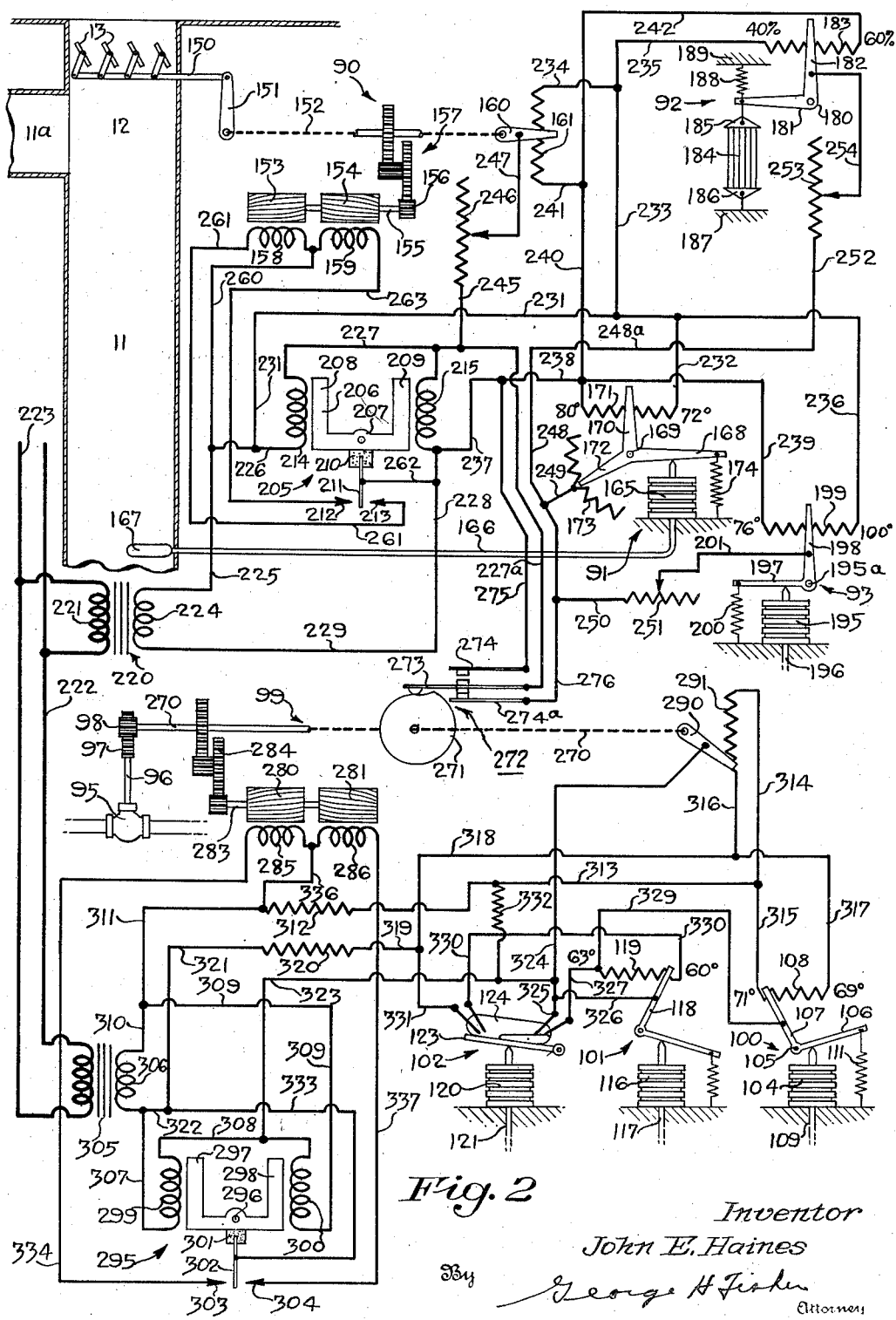

For a full disclosure of my invention, reference is made to the following detailed description and to the drawings, in which Figure 1 shows diagrammatically a summer-winter air conditioning system which forms my invention; and Figure 2 shows a wiring diagram of part of the control system illustrated in Figure 1.

Referring to Figure 1, reference character 1 indicates an air conditioning chamber. Located within conditioning chamber 1 is a preheater coil 2, a spray pipe 3 and a reheater 4. The discharge end of the conditioning chamber 1 is connected to a fan 5 which discharges into a delivery duct 6, this duct having branches 7 and 8 leading to the conditioned spaces 9 and 10. A return air duct 11 is connected to the spaces 9 and 10 in a suitable manner (not shown). Duct 11 is connected to a by-pass duct 12 which joins the conditioning chamber 1 at a point intermediate the spray 3 and the reheater 4. Duct 11 is also connected to an auxiliary return duct 11a which leads to a duct 14 which in turn is connected to the inlet end of the conditioning chamber 1 adjacent to the fresh air inlet duct 15, the duct 14 also leading to a suitable discharge (not shown). A suitable damper 16 may be provided in the fresh air duct 15 for controlling the quantity of fresh air admitted to the conditioning chamber 1. Also, dampers 17 and 18 may be provided for controlling the proportions of return air discharged into the conditioning chamber 1 and discharged from the building through the discharge duct 14. By this arrangement a mixture of fresh and return air is passed through the conditioning chamber and is then delivered to the spaces to be conditioned. Also the return air is in part exhausted from the building, passed across the preheater to the spray 3, and by-passed therearound.

A receiver 20 is provided for supplying chilled water to the spray pipe 3. This receiver is connected at its lower end by a pipe 21 to the cold water inlet of the three-way valve 22. The intermediate chamber of the three-way valve 22 is connected by a pipe 23 to the inlet of a pump 24, the discharge side of such pump being connected by a pipe 25 to the spray pipe 3. Located below the spray pipe 3 is a trough 26 for collecting the water issuing from said spray pipe. The trough 26 is connected to a drain pipe 27 having a branch 28 leading back to the receiver 20 and a branch 29 which leads to the return water inlet of the three-way valve 22. Located within the casing of the three-way valve 22 is a valve member 30, the valve stem thereof being secured to a gear rack 31, which gear rack cooperates with a pinion 32 which is secured to the shaft of a proportioning motor 33. This proportioning motor may be of the type shown and described in Patent No. 1,989,972 issued to Lewis L. Cunningham on May 5, 1935.

The proportioning motor 33 is adapted to be controlled by a temperature controller generally indicated at 35. The controller 35 comprises a bellows 36 which is secured at its lower end to a suitable support 37 and which at its upper end is provided with an abutment 38 which cooperates with the actuating arm 39 of a bell crank lever 40. Bell crank lever 40 also includes a control arm 41 which engages a control resistance 42. The control arm 41 and the control resistance 42 are connected to the proportioning motor as indicated in the Cunningham patent above referred to. Also connected to the actuating arm 39 of bell crank lever 40 is a spring 43 which is secured to the fixed support 37. The interior of the bellows 36 is connected to a capillary tube 44 which leads to a temperature control bulb 45 located in the conditioning chamber 1 at a point between the spray pipe 3 and the point at which by-pass duct 12 joins the conditioning chamber. The bulb 45, tube 44 and bellows 36 contain a volatile fluid as well known in the art. Therefore, as the temperature of the air issuing from the spray 3 increases, the pressure of the volatile fill will increase, this causing expansion of the bellows 36 and consequent movement of the control arm 41 across the control resistance 42 in a counter-cockwise direction. Conversely, upon a fall in temperature at the bulb 45 the bellows 36 will contract thereby permitting the control arm 41 to be moved in the opposite direction under the action of the spring 43.

The proportioning motor 33 is arranged to assume angular positions corresponding to the positioning of the control arm 41 on the control resistance 42. The controller 35 may be so designed and adjusted that when the temperature at the bulb 45 is 50° F. the control arm 41 will engage the extreme right-hand portion of control resistance 42, while when the temperature at bulb 45 is increased to 56° F. the control arm 41 will engage the extreme left-hand end of control resistance 42. The arrangement of the proportioning motor 33 relative to the controller 35 may be such that the valve member is moved to its extreme upper position when the control arm 41 engages the extreme left-hand end of control resistance 42. Therefore, when the temperature of the air issuing from the spray pipe 3 is up to 56° F. the three-way valve will be positioned to cause flow of cold water from the receiver directly to the spray pipe 3 without admixture of return water. The proportioning motor 33 is also arranged with respect to the valve member 30 so that it will move said valve member to its extreme lower position when the control arm 41 engages the extreme right-hand end of control resistance 42. By this arrangement, when the temperature of the air issuing from the spray falls to 50° F. no delivery of chilled water from the receiver through pipe 21 will take place, but a circulation of return water through pipe 27 and branch 29 to the delivery pipe 23 will occur. For values of temperature intermediate 50° F. and 56° F. the proportioning motor will position valve member 30 at intermediate positions in accordance with the temperature at bulb 45, this causing a mixture of chilled water through pipe 21 and return water through pipes 27 and 29 to be supplied to the spray pipe 3, the proportions of the mixture being varied to cause the temperature of the spray water to be decreased as the temperature at the bulb 45 increases.

In order to chill the water in the receiver 20 a refrigeration coil 50 is located therein, this coil forming part of a compression refrigeration system including a compressor 51, a condenser 52 and an expansion valve 52a. As such refrigeration systems are well known in the art a further description of such system appears to be unnecessary. The compressor motor is controlled by a magnetic starter or relay generally indicated at 53, this relay comprising switch arms 54 and 55 cooperating with respective contacts 56 and 57. Switch arms 54 and 55 are connected in a suitable manner to a plunger located within the coil 58. When this coil is energized the switch arms 54 and 55 are moved into engagement with the contacts 56 and 57, this causing the compressor motor to be connected to the line wires 59 and 60, thereby placing the compression refrigeration system in operation to cool the water within receiver 20. When relay coil 58 is deenergized, however, the switch arms 54 and 55 are moved away from their respective contacts under the action of gravity or springs, not shown, thereby placing the refrigeration system out of operation.

One end of the relay coil 58 is connected by a wire 61 with the low voltage secondary 62 of transformer 62a, the primary of which is connected to line wires 59 and 60. The other end of relay coil 58 is connected by wire 63 to the mercury switch 64 of the temperature controller generally indicated as 65. The temperature controller 65 comprises a bellows 66 cooperating with the pivoted switch carrier 67 which carries the mercury switch 64. The bellows 66 is connected by a capillary tube 68 to a control bulb 69 located within the receiver 20. The arrangement is such that when the temperature within receiver 20 rises above a predetermined value, for instance 40° F., the bellows 66 will be expanded sufficiently to tilt the mercury switch 64 to closed position. When, however, the temperature of the water within the receiver is below the predetermined value the bellows 66 will contract sufficiently to cause the mercury switch 64 to be tilted to open position. The mercury switch 64 is connected by a wire 70 to an auxiliary switch 71 which is mounted upon the shaft of the proportioning motor 33, the other terminal of the auxiliary switch 71 being connected to the secondary 62 of the transformer 62a by a wire 72. The auxiliary switch 71 is arranged to close whenever the valve member 30 of the three-way valve 22 is moved from its extreme lower position but to open when the valve member 30 reaches its extreme lower position. Assuming auxiliary switch 71 to be closed due to the three-way valve being moved from its extreme lower position, if the temperature in the receiver should rise above 40° F., the relay coil 58 will be energized as follows: transformer secondary 62, wire 61, relay coil 58, wire 63, mercury switch 64, wire 70, auxiliary switch 71, and wire 72 to transformer secondary 62. This will cause operation of the refrigeration system to lower the temperature of the water within receiver 20. When this temperature is lowered sufficiently the mercury switch 64 will be tilted to open position, this causing deenergization of relay coil 58 and consequent stopping of the compressor 51. It should therefore be apparent that by this arrangement the controller 65 will act to maintain the temperature of the water within the receiver 20 below a predetermined value, such as 40° F., whenever the three-way valve 22 is adjusted so as to deliver water from the receiver 20 to the spray pipe 3. When, however, the three-way valve is adjusted so as to prevent delivery of water from the receiver, the refrigerating system will be placed out of operation by the auxiliary switch 71 regardless of the temperature of the water within receiver 20.

For controlling the flow of heating medium into the preheater coil 2 a valve 75 is provided, this valve having a gear rack 76 secured to its valve stem. Cooperating with the gear rack 76 is a pinion 77 which is secured to the shaft of a proportioning motor 78. This proportioning motor is preferably of the type illustrated in the Cunningham patent hereinbefore mentioned, and is arranged to be controlled by a temperature controller generally indicated at 80. The temperature controller 80 is similar in all respects to the controller 35 and comprises a bellows 81 to which is secured a capillary tube 82 which is connected to a control bulb 83 located adjacent the control bulb 45. The temperature controller 80 also comprises a control arm 84 cooperating with a control resistance 85, this control arm and control resistance being connected to the proportioning motor 78. The controller 80 is preferably designed and adjusted so that when the temperature at control bulb 83 is at or above 44° F. the control arm 84 will engage the extreme left-hand end of the control resistance 85. The controller 80 is also arranged so that when the temperature at control bulb 83 falls to 40° F. the control arm 84 will traverse the entire control resistance 85 and engage the extreme right-hand end thereof. The proportioning motor 78 is so associated with the control arm 84 and the control resistance 85 that it assumes angular positions corresponding to the position of control arm 84 on the control resistance 85. The arrangement is such that when the control arm 84 engages the extreme left-hand end of control resistance 85 the proportioning motor 78 will move the valve to a full closed position as illustrated. However, as the control arm 84 moves across control resistance 85 from left to right the proportioning motor 78 will progressively open the valve, and when the arm 84 engages the extreme right-hand end of resistance 85 the valve will be moved to a full open position. It should therefore be apparent that when the temperature of the air issuing from the spray is above 44° F. the valve 75 will be fully closed thereby preventing any heating of the air by preheater 2. As the temperature of the sprayed air falls below 44° F., however, the valve 75 will be progressively opened and will reach full open position when the temperature of the sprayed air falls to 40° F.

From the foregoing, it should be seen that the controllers 35 and 80 act to maintain the temperature of the sprayed air within a predetermined range, that is, between 40° F. and 56° F. When the temperature of the sprayed air is at 56° F. the three-way valve 22 will be so positioned that only cold water from the receiver 20 is delivered to the spray pipe 3. As the temperature of the sprayed air falls, however, the three-way valve will be moved to progressively decrease the proportion of cold water from receiver 20 and increase the proportion of recirculated water from trough 26 which is passed through the spray pipe 3. When the sprayed air temperature falls to 50° F. the three-way valve 22 will be positioned to pass all recirculated water to the spray pipe 3 and to prevent delivery of water from the receiver 20 to said spray pipe. At the same time the auxiliary switch 71 will act to place the refrigeration system out of operation. As the sprayed air temperature continues to fall entirely recirculated water will be sprayed over the air. When the temperature falls to 44° F., however, the steam valve 75 will begin to open and upon further fall in temperature the steam valve will be opened still more, reaching full open position when the sprayed air temperature falls to 40°

F. Therefore, as the sprayed air temperature falls from a maximum to a minimum the temperature of the sprayed water is gradually reduced and upon further reduction in temperature of the air the preheater coil is placed into operation.

Located in the by-pass duct 12 is a by-pass damper 13, this damper being controlled by a proportioning motor 90. The proportioning motor 90 is controlled primarily by a return duct temperature controller 91. Proportioning motor 90 is also controlled by a humidity controller 92 located within one of the conditioned spaces. In addition the proportioning motor 90 is controlled by an outside temperature responsive controller 93. The construction and operation of these controllers will be described in detail in connection with Figure 2. In general the purpose of these controllers is to control the by-pass damper 13 during the cooling cycle of the system. The purpose of the humidity controller 92 is in effect to adjust the control point of the temperature controller 91 in a manner to cause effective temperature control of the by-pass damper 13. The purpose of the controller 93 is to adjust the control point of the temperature controller 91 in accordance with outdoor temperature in accordance with customary practice. The specific manner in which these various controllers cooperate in the control of the by-pass damper 13 will be described in detail later in this specification.

A valve 95 is provided for controlling the flow of heating medium to the reheater coil 4. Attached to the stem 96 of valve 95 is a gear rack 97 which is arranged to engage a pinion 98 secured to the shaft of the proportioning motor 99. This proportioning motor 99 will be described in detail in connection with Figure 2 and is controlled by means of a return duct temperature controller 100 and also by a low limit controller 101 which is responsive to the temperature of the air in the delivery duct 6. In order to place the low limit controller 101 out of operation during the cooling cycle of the system the controller 102 is provided, which is responsive to the temperature of the air in the return duct 11.

The controller 100 comprises a bellows 104 which is secured at its lower end to a suitable fixed support and which at its upper end cooperates with a bell crank lever 105 consisting of an actuating arm 106 and a control arm 107, said control arm 107 being arranged to engage a control resistance 108. The interior of the bellows 104 is connected by a capillary tube 109 to a control bulb 110 located in the return air duct 11. The control bulb 110, tube 109 and bellows 104 contain a suitable volatile fluid, as is well known in the art. Upon an increase in temperature at control bulb 110 the pressure of the volatile fill will increase, this causing the bellows 104 to expand, this action resulting in movement of the control arm 107 across resistance 108 in a counterclockwise direction. Upon a decrease in temperature at bulb 110 the pressure of the volatile fill will decrease, this permitting the control arm 107 to be rotated in the opposite direction under the action of a spring 111. The controller 109 is preferably designed and adjusted so that the control arm 107 will engage the extreme left end of resistance 108 when the temperature of the return air is 71° F. and to engage the extreme right end of resistance 108 when the return air temperature falls to 69° F.

The low limit controller 101 may be formed similarly to the controller 100. This instrument, however, includes a bulb 115 located in the delivery duct 6, this bulb being connected to the bellows 116 by a capillary tube 117. This instrument is preferably designed and adjusted so that when the return air temperature is above 63° F. the control arm 118 will engage the extreme left-hand end of control resistance 119. When the return air temperature falls to 60° F., however, the control arm 118 will engage the extreme right-hand end of control resistance 119.

The controller 102 includes a bellows 120 which is connected by a capillary tube 121 to a control bulb 122 located in return air duct 11. The bellows 120 is arranged to cooperate with a mercury switch carrier 123 which carries a double-ended mercury switch 124. This controller is arranged so that when the return air temperature is above 71° F. the mercury switch 124 will be tilted to the position shown. When, however, the temperature within the return air duct falls below this value the mercury switch 124 will be tilted in the opposite direction. The purpose of the controller 102 is to place the low limit controller 101 out of operation whenever the return air temperature is above 71° F., which is an indication that the system is operating on the summer cycle.

Located within the branch delivery ducts 7 and 8 are booster heating coils 130 and 131 respectively. These booster heating coils are provided with heating fluid controlling valves 132 and 133, these valves having gear racks 134 and 135 secured to their respective valve stems. The gear rack 134 of valve 132 is arranged to cooperate with a pinion 136 secured to the shaft of a proportioning motor 137 while a similar proportioning motor 138 is arranged to drive a pinion 139 cooperating with a gear rack 135 of the valve 133. The proportioning motors 137 and 138 are controlled by temperature controllers 140 and 141 respectively, these temperature controllers being located within the spaces 9 and 10. Temperature controllers 140 and 141 are of usual form and each consists of a bellows 142 which is filled with a volatile fluid and which is arranged to actuate a bell crank lever 143 having a control arm 144 engaging a control resistance 145. These instruments may be so designed and adjusted that the control arms 144 will engage the extreme left-hand end of control resistances 145 when the space temperature is 71° F. and so that the control arms 144 will engage the opposite ends of control resistances 145 when the space temperature is 69° F. Furthermore, each of these controllers is associated with its respective proportioning motor in a manner to cause the corresponding valve to be closed entirely when the space temperature is 71° F. and to gradually open the steam valve as the space temperature falls, the valve assuming a wide open position when the space temperature falls to 69° F. By this arrangement the proper temperature will be maintained within the spaces 9 and 10 by the action of the booster heaters 130 and 131 in cooperation with the heating effect of the reheater 4. As hereinbefore mentioned, the reheater 4 is controlled by the controller 100 which is responsive to the temperature of the air in the return air duct 11. As the air within the return duct 11 is a mixture of the air taken from all of the spaces its temperature will be an average of the temperatures of the various spaces and hence the reheater 4 will be controlled in accordance with the average requirement for heat of the total number of spaces. The booster heaters 130 and 131, however, will be individually controlled in a manner to maintain the temperature in their respective zones constant. Thus should the heating load of the spaces 9 and 10 vary, the controllers 140 and 141 will change the positions of the booster heater valves, thereby changing the amount of additional heat supplied in a manner to maintain constant temperature conditions.

Referring now to Figure 2, the construction and operation of the by-pass damper controlling proportioning motor 90 and its controllers will be described in detail. The by-pass damper 13 is herein illustrated as comprising a plurality of rotatable louvres, these louvres being connected together by an actuating member 150 which in turn is secured to the shaft 152 of the proportioning motor 90. The proportioning motor 90 comprises a first rotor 153 and a second rotor 154, these rotors being secured to a shaft 155 carrying a pinion 156 of the gear train 157. The last gear of the gear train is secured to the shaft 152 and in this manner the rotors 153 and 154 drive the shaft 152. Cooperating with the rotor 153 is a field coil 158 and cooperating with the rotor 154 is a similar coil 159. The rotor 153 and its associated coil 158 form one motor, this motor when energized acting to drive the shaft 152 in one direction. The rotor 154 and its associated coil 159 form a second motor, this motor being arranged when energized to drive the shaft 152 in the opposite direction to that caused by operation of the other motor. The two motors, therefore, may be considered as a reversible electric motor. Also secured to the shaft 152 is a balancing arm 160 which is arranged to cooperate with a balancing resistance 161. The arm 160 and resistance 161 therefore comprise a balancing potentiometer, this potentiometer being arranged so that the arm 160 contacts the extreme upper end of resistance 161 when the by-pass damper 13 is moved to closed position. As the by-pass dampers are moved towards open position the balancing arm 160 is rotated by the shaft 152 in a clockwise direction and when the dampers are completely open the arm 160 engages the extreme lower end of the balancing resistance 161.

For controlling the proportioning motor 90 the temperature controller 91 is provided. This temperature controller comprises a bellows 165 which is connected by a capillary tube 166 to a control bulb 167 located in the return air duct 11. The bellows 165 is arranged to actuate the actuating arm 168 of the bell crank lever 169, this bell crank lever having a control arm 170 cooperating with the control resistance 171 and a corrector arm 172 which cooperates with the corrector resistance 173. This instrument is designed and adjusted so that when the return air duct temperature is above 80° F. the bellows 165 will be expanded sufficiently to cause the control arm 170 to engage the extreme left-hand end of the control resistance 171. As the return air temperature falls below 80° F., however, the bellows 165 will contract permitting the control arm 170 to be rotated in a clockwise direction across control resistance 171 under the action of spring 174. When the return air duct falls to 72° F. the control arm 170 will engage the extreme right-hand end of resistance 171. It will be apparent that as the control arm 170 is moved across the resistance 171 the corrector arm 172 will be correspondingly moved across the corrector resistance 173.

Located at a suitable point within one of the spaces is a humidity controller 92, this controller comprising a bell crank lever 180 having an actuating arm 181 and a control arm 182 which cooperates with a control resistance 183. Attached to the actuating arm 181 is a humidity responsive device, this device comprising a plurality of strands of humidity responsive material 184 secured at their upper and lower ends to clamping members 185 and 186 respectively. The upper clamping member 185 is secured to the actuating arm 181 while the lower clamping member is secured to a suitable fixed element 187. Also connected to the actuating arm 181 is a spring 188, this spring being in turn connected to a fixed support 189. Upon a decrease in humidity within the space, the strands 184 will decrease in length, this causing a downward movement of arm 181 against the action of the spring 188 this resulting in movement of the control arm 182 in a counter-clockwise direction across the control resistance 183. Upon an increase in humidity the strands 184 will increase in length, this permitting the control arm 181 to be moved across the control resistance 183 in a clockwise direction under the action of the spring 188. This instrument may be designed and adjusted so that the arm 182 engages the extreme left-hand end of resistance 183 when the relative humidity in the space is 40% and so that the arm 182 engages the extreme right-hand portion of resistance 183 when the relative humidity is 60%.

Also controlling the proportioning motor 90 is the outdoor temperature responsive controller 93. This controller comprises a bellows 195 cooperating with a bell crank lever 195a having an actuating arm 197 and a control arm 198 engaging a control resistance 199. The bellows 195 is connected by a capillary tube 196 to a control bulb 197 in the fresh air duct 15 (Figure 1). As the outdoor temperature increases the bellows 195 will expand, this causing rotation of the control arm 198 against the action of spring 200 across the control resistance 199 in a clockwise direction. Upon falling outdoor temperature the bellows 195 will contract and the control arm 198 will be moved in the opposite direction under the action of the spring 200. This instrument may be adjusted so that the control arm 198 engages the extreme left-hand portion of resistance 199 when the outdoor temperature is 76° F. When the outdoor temperature rises to 100° F., however, the control arm 198 will engage the extreme right-hand end of the resistance 199.

Reference character 205 designates generally a balanced relay comprising a U-shaped armature 206 which is pivoted at 207, and is provided with legs 208 and 209. Secured to armature 206 by means of an insulating member 210 is a switch arm 211 which is adapted to cooperate with contacts 212 and 213. Cooperating with the leg 208 of armature 206 is a relay coil 214, a similar coil 215 cooperating with the leg 209. When the relay coils 214 and 215 are equally energized the upward pulling effect exerted upon the two legs of the armature 206 will be equalized and the armature will assume the position shown in which the switch arm 211 is disengaged from both contacts 212 and 213. If the relay coil 214 is energized to a greater extent than coil 215 the upward pulling effect exerted upon the leg 208 will be greater than that exerted upon leg 209, this causing the armature 206 to be rotated in a clockwise direction bringing the switch arm 211 into engagement with contact 212. If, on the other hand, the relay coil 215 is energized more highly than the relay coil 214, the armature will be rotated in the opposite direction bringing the switch arm 211 into engagement with the contact 213.

Reference character 220 designates a step-down transformer having a high voltage primary 221 connected across the line wires 222 and 223. The low voltage secondary 224 of transformer 220 is connected by means of wires 225 and 226 to the lower end of the relay coil 214. The upper end of relay coil 214 is connected to the upper end of relay coil 215 by a wire 227 and the lower end of the relay coil 215 is connected by wires 228 and 229 to the transformer secondary 224. In this manner the relay coils 214 and 215 are connected in series across the transformer secondary 224. Connected to the wire 226 is a wire 231 which is in turn connected to a wire 232 leading to the right-hand end of control resistance 171 of temperature controller 91. Also connected to wire 231 is a wire 233, this wire being connected to a wire 234 leading to one end of the balancing resistance 161. The wire 233 is also connected to a wire 235 which leads to the left-hand end of the humidostat control resistance 183. Also connected to the wire 231 is a wire 236 leading to the right-hand end of the outdoor controller resistance 199. Connected to the lower end of the relay coil 215 is a wire 237, this wire being connected to the left-hand ends of the resistance 171 and resistance 199 by wires 238 and 239. A wire 240 leads from the junction of wires 238 and 239, this wire being connected to the lower end of balancing resistance 160 by a wire 241 and being connected to the right-hand end of the humidostat control resistance 183 by wire 242. From the foregoing it should be apparent that the resistances 161, 171, 183 and 199 are connected in parallel with the serially connected relay coils 214 and 215 across the transformer secondary 224.

Mounted upon the main operating shaft 270 of the proportioning motor 99 for the steam valve 95 is a cam 271. This cam is arranged to operate a switching device or auxiliary switch 272 which comprises a switch arm 273 formed as a cam follower, this switch arm being arranged to selectively engage the contact arm 274 or the contact arm 274a. The cam 271 is mounted upon the motor shaft 270 in such manner that when the valve 95 is completely closed, the recessed portion of said cam will engage the switch arm 273, this permitting said arm to engage the contact arm 274a. When, however, the steam valve 95 is moved from closed position, the raised portion of the cam 271 will engage switch arm 273, this forcing said switch arm away from engagement with contact arm 274a and into engagement with contact arm 274. The switch arm 273 is connected to the wire 227 which joins the upper ends of relay coils 214 and 215 by means of wire 227a. To the contact arm 274a is connected a wire 276, this wire being connected to wire 250 leading to rheostat 251, which in turn is connected by wire 201 to the control arm 198 of the outdoor temperature responsive controller 93. Connected to the junction of wires 276 and 250 is a wire 248, this wire being connected by a wire 249 with the corrector resistance 171 of the return air responsive controller 91. The wire 248 also leads to the horizontal wire 248a which is connected by wire 252, rheostat 253 and wire 254 to the control arm 182 of the humidity responsive controller 92. Connected also to the wire 227 is a wire 245, this wire leading to rheostat 246, this rheostat being in turn connected to the balancing arm 160 of the balancing potentiometer by wire 247. From the foregoing, it should be seen that the balancing arm 160 is always connected to the upper ends of relay coils 214 and 215, and that the control arms 170, 182 and 198 are connected to the upper ends of said relay coils so long as the steam valve 95 remains closed. This connecting of the balancing arm and the control arms to the connected ends of the relay coils 214 and 215 has the effect of placing part of the balancing resistance and of each control resistance in parallel with one of the relay coils, and the remaining parts of said resistances in parallel with the other of the relay coils.

Assuming the steam valve 95 to be closed with the balancing arm 160 and the control arms 170, 182 and 198 in their mid-positions as shown, they will engage points on their respective resistances having the same potential as the junction of the relay coils 214 and 215. Under this condition no current will flow to or from the junction of relay coils 214 and 215 and hence the said relay coils will be equally energized, this causing the switch arm 211 to be disengaged from both contacts 212 and 213. If now the return air temperature should fall, the control arm 170 of controller 91 will move along the control resistance 171 to the right. This will have the effect of reducing the portion of resistance 171 which is in parallel with the relay coil 214 and of increasing the portion of resistance 171 which is in parallel with the relay coil 215. This will cause the current flow in relay coil 214 to decrease and the current flow in relay coil 215 to increase. The relay coil 215 will thus become more highly energized than relay coil 214 this having the action of rotating the armature 206 to bring the switch arm 211 into engagement with the contact 213. Engagement of the switch arm 211 with contact 213 will establish an energizing circuit for the motor field coil 158 as follows: transformer secondary 224, wire 225, wire 260, field coil 158, wire 261, contact 213, switch arm 211, wire 262, wire 228 and wire 229 back to transformer secondary 224. This will cause rotation of the proportioning motor shaft 152 in a direction to open the damper 13. At the same time the balancing arm 160 will be rotated downwardly across balancing resistance 161, this having the effect of reducing the portion of balancing resistance 161 which is in parallel with relay coil 215 and of increasing the portion of resistance 161 which is in parallel with relay coil 214. The effect of this will be to decrease the current flow in relay coil 215 and to increase the current flow in relay coil 214, this action thereby compensating for the previous unbalancing effect initiated by the controller 91. When the rotation of the proportioning motor shaft is sufficient to cause the balancing arm to be moved sufficiently to overcome the unbalancing effect of controller 91 on the relay 205 the relay coils 214 and 215 will be again equally energized and the switch arm 211 will be disengaged from the contact 213. As the movement of the proportioning motor shaft 152 must be sufficient to overcome the unbalancing effect of controller 91 it will be apparent that the movement of shaft 91 will be proportional to the initial movement of the control arm 170 across the control resistance 171. In other words, the more the temperature in return duct 11 decreases the further the movement of the dampers towards closed position by the proportioning motor 90 is necessary before the relay 205 will become rebalanced.

If the temperature within the return duct should increase the control arm 170 will be moved across the control resistance 171 in the opposite direction, this having the effect of decreasing the portion of said control resistance in parallel with relay coil 215 and increasing the portion of said resistance in parallel with the relay coil 214. This will cause the relay coil 214 to be energized more highly than relay coil 215, this causing the switch arm 211 to be brought into engagement with contact 212. Engagement of switch arm 211 with contact 212 will cause energization of the motor field coil 159 by a circuit as follows: transformer secondary 224, wire 225, wire 260, field coil 159, wire 263, contact 212, switch arm 211, wire 262, wire 228 and wire 229 to transformer secondary 224. This will cause rotation of the motor shaft 152 in a direction to close the damper 13 and to rotate the balancing arm 160 in a counter-clockwise direction. This rotation of balancing arm 160 will have the effect of decreasing the portion of balancing resistance 161 which is in parallel with the relay coil 214 and increasing the portion of such resistance which is in parallel with the relay coil 215. This will have the effect of decreasing the current flow in relay coil 214 and increasing the current flow in relay coil 215. When the movement of the balancing arm 160 is sufficient to overcome the initial unbalancing action of the controller 91 the relay coils will again be balanced thereby causing switch arm 211 to disengage from contact 212, this causing stopping of the proportioning motor 90 in its new position. It should now be apparent that the position assumed by the proportioning motor will vary in acordance with the position of the control arm 170 on the control resistance 171. It should further be apparent that as the temperature of the return air falls the damper 13 will progressively be moved towards open position, and that as the return air temperature rises the damper 13 will be progressively moved towards closed position.

If the relative humidity within the conditioned space should increase the control arm 182 of the humidity controller 92 will be moved in a clockwise direction across the control resistance 183, this acting to reduce the portion of control resistance 183 which is in parallel with the relay coil 215 and to increase the portion of said resistance which is in parallel with relay coil 214. This will have the effect of reducing the current flow in relay coil 214 and increasing the current flow in relay coil 214, this action causing the switch arm 211 to be brought into engagement with the contact 212, this causing rotation of the proportioning motor in a direction to move the by-pass damper towards closed position. Under this action the balancing arm 160 will be rotated in a counter-clockwise direction across the balancing resistance 161, this having the effect of reducing the current flow in relay coil 214 and increasing the current flow in relay coil 215 to thereby reduce the initial unbalancing effect caused by the controller 92. When the movement of the proportioning motor is sufficient to cause the balancing potentiometer to balance out the initial unbalancing action of the controller 92, the relay 205 will cause stopping of the motor at this point. In a similar manner, if the relative humidity within the space should decrease the humidity controller will act to unbalance the relay 205 in the opposite direction, this causing rotation of the motor shaft 152 in a direction to open the by-pass damper 13, and the amount of opening movement will be dependent upon the initial unbalancing action of the controller 92. The humidity controller 92 therefore acts to increase the opening of the by-pass damper 13 as the relative humidity within the conditioned space decreases and to decrease the opening of the by-pass damper 13 as the relative humidity increases.

Upon a decrease in outside temperature the control arm 198 of the controller 93 will move to the left across the control resistance 199, this having the effect of decreasing the portion of control resistance 199 which is in parallel with the relay coil 215 and increasing the portion of said resistance which is in parallel with the relay coil 214. This will cause a greater current flow in relay coil 214 than occurs in relay coil 215, this having the effect of moving the switch arm 211 into engagement with contact 212 thus energizing field coil 159. This causes the motor shaft 152 to be rotated in a direction to close the damper 13 and to move the balancing arm 160 upwardly across the balancing resistance 161. This movement of the balancing arm 160 will decrease the portion of balancing resistance 161 in parallel with the relay coil 214 and increase the portion of said resistance which is in parallel with relay coil 215. The effect thus will be to compensate for the initial unbalancing effect of the controller 93. When the damper has been moved sufficiently to cause the balancing potentiometer to fully compensate for the unbalancing effect of controller 93 the proportioning motor will stop in this new position. In a similar manner, as the outside temperature increases the control arm 198 of the controller 93 will move to the right across control resistance 199, this in a manner which should now be apparent, causing rotation of the proportioning motor in a direction to open the by-pass damper 13.

It will be noted that the rheostat 246 is interposed between the balancing arm 160 and the junction of the relay coils 214 and 215. The purpose of this rheostat is to desensitize the balancing potentiometer to thereby make the operating range of the controller 91 less than its total range. In other words, by reducing the current flow through the balancing arm 160 this arm must travel a greater distance across the resistance 161 to have the same effect upon the relative energizations of relay coils 214 and 215 than would be necessary if the resistance of rheostat 246 were not present. Therefore, a relatively small movement of the control arm 170 across the control resistance 171 may effect such an unbalancing of the energizations of relay coils 214 and 215 that it will require movement of the balancing arm 160 across the entire range of movement on resistance 161 to cause rebalancing. Thus by properly adjusting the rheostat 246 the proportioning motor may be made to move the by-pass damper 13 from a full open position to a full closed position upon movement of the control arm 170 across but a fraction of its range. For instance, while the controller 91 has a total range of 8° F., movement of the control arm 170 through an angle corresponding to but 2° F. will cause movement of the by-pass damper from one extreme position to the other.

As hereinbefore pointed out, the humidity controller 92 affects the positioning of by-pass damper 13 on a rise in humidity in the same manner as the temperature controller 91 acts upon a rise in temperature. In other words, upon a rise in temperature the controller 91 acts to close the by-pass damper 13 and upon a rise in humidity the humidity controller 92 acts to move the by-pass damper 13 further towards closed position. Conversely, upon a fall in temperature the temperature controller 91 will act to move the by-pass dampers further towards open position and if the humidity should fall the humidity controller 92 will cause additional movement of the by-pass damper 13 to open position. The effect of the humidity controller, therefore, is to vary the relationship between the temperature controller 91 and the proportioning motor 90 in a manner to compensate for changes in humidity. Thus, should the humidity within the space fall, it will have the same effect upon the proportioning motor as would occur if the temperature within the space should fall. In other words, even though the temperature controller 170 remains stationary, the proportioning motor will be caused to move the by-pass damper towards open position. In order for the temperature controller 91 to bring the damper back to its original position the control arm 170 must be moved across the control resistance 171 in a counterclockwise direction, this requiring that the temperature of the return air increase. The action of the humidity controller 92, therefore, is to change the location of the operating range of the temperature controller 91 within its total range of operation. Or put another way, the humidity controller 92 acts to change the control point of the temperature controller 91 in accordance with changes in humidity. It will be noted that the rheostat 253 is interposed between the control arm of the humidity controller and the junction of the relay coils 214 and 215. The purpose of this rheostat is to provide adjustment of the effect of the humidity controller on the controller 91. By increasing the resistance in this circuit the effect of the controller 92 will be reduced while by decreasing this resistance the effect of the controller 92 on the temperature controller 91 will be increased. In this manner the change in control point of the temperature controller for a given change in humidity may be determined. By properly adjusting this resistance the humidity controller may be made to change the temperature controller's control point in a manner to maintain a constant effective or comfort temperature.

The function of the outdoor temperature controller 93 is likewise to change the control point of the temperature controller 91. In present air conditioning practice it is considered desirable to vary the temperature maintained within the conditioned space in accordance with outside temperature instead of maintaining the temperature within the space at a constant value, the purpose of this being to avoid shock to persons entering the space from outside and also to conserve on operating costs. As hereinbefore pointed out, the outdoor temperature controller 93 acts in opposition to the indoor temperature controller 91. In other words, upon an increase in indoor temperature the controller 91 will act to move the by-pass damper 13 towards closed position. Upon an increase in outdoor temperature, however, the controller 93 will act to move the by-pass damper 13 towards open position. Therefore, if the indoor temperature should remain constant but the outdoor temperature increase, the temperature controller 93 will act to move the damper 13 to open position. In order for the temperature controller 91 to cause movement of the by-pass damper 13 back to its original position, the space temperature must be increased. In this manner, therefore, the outdoor temperature controller acts to raise the control point of the temperature controller 91 as outdoor temperature increases. Conversely, as the outdoor temperature decreases the outdoor temperature responsive controller 93 will act to lower the control point of the indoor controller 91. It will be noted that the rheostat 251 is interposed between the control arm 198 of the outdoor controller and the junction of relay coils 214 and 215. The purpose of the rheostat 251 is to vary the effect of the outdoor controller upon the control point of the indoor controller 91. If desired this rheostat may be so adjusted that a 1° F. change of indoor temperature has the same effect upon the proportioning motor as would occur for a 3° F. change in outside temperature. Therefore, with such adjustment for each 3° F. rise of outside temperature the control point of the controller 91 will be raised 1° F. Therefore, when the outdoor temperature is below the range of the controller 93 the indoor controller will be adjusted to maintain a return air temperature of 72° F. As the outdoor temperature rises above 76° F. the control point of controller 91 will be raised 1° for every 3° of such outdoor temperature rise and thus when the outdoor temperature becomes 100° F. the controller 91 will act to maintain a return air duct temperature of 80°.

From the foregoing it should be apparent that the by-pass damper 13 is controlled to maintain primarily a constant return air temperature which is determined by outdoor temperature and inside relative humidity. When the return air temperature increases the by-pass damper will be moved towards closed position, this causing an increase in flow of air through the refrigerated spray water issuing from the spray pipe 3 and decreasing the portion of the air by-passed around such spray. This will have the effect of increasing the amount of cooling. Therefore, as the return air temperature increases the return air temperature controller 91 will act to increase the cooling effect of the air correspondingly. Also it should be apparent that the return air temperature controller 91 is adjusted by the humidity controller to maintain a constant effective temperature. In other words, as the humidity within the space increases the return air temperature controller will be adjusted to maintain a lower temperature, thereby compensating for the effect upon human comfort of such rise in humidity. Furthermore, it should be apparent that the return air temperature maintained will be varied in accordance with a predetermined schedule with variations in outdoor temperature.

It will be remembered that the operation of the system just described occurs only when the steam valve 95 is closed. If now, should the return air temperature fall sufficiently to cause opening of the steam valve, the resulting rotation of cam 271 will cause switch arm 273 to disengage contact arm 274a, and to engage contact arm 274. This will disconnect the control arms 170, 182 and 198 from the connected ends of the relay coils, and also cause short-circuiting of relay coil 215 by a circuit as follows: upper end of relay coil 215, wire 227, wire 227a, switch arm 273, contact arm 274, wire 275, and wire 237 to lower end of relay coil 215. This short-circuit of relay coil 215 completely unbalances the relay, causing switch arm 211 to engage the contact 212, this causing energization of field coil 159 and rotation of the shaft 152 in a direction to completely close the by-pass damper 13. Due to the complete short-circuiting of the relay coil 215 the balancing potentiometer will be incapable of rebalancing the relay and consequently the damper 13 will be completely closed. It should therefore be apparent that when the steam valve 95 is opened, the by-pass damper 13 will be moved to complete closed position regardless of the return air temperature. When, however, the steam valve 95 is completely closed the control of the by-pass damper 13 will be effected in the manner hereinbefore described.

The purpose of the corrector resistance 173 and the corrector arm 172 is to effect proper operation of the controller 91 when the control arm 170 approaches either of its extreme positions. For a more detailed description of the function of the corrector resistance 173 and of the compensated control system just described, reference is made to my co-pending application, Serial No. 38,446, filed September 3, 1935. While for the sake of clearness I have omitted the usual limit switches, it will be understood that such limit switches may be employed. For a disclosure of such limit switches reference is made to Patent No. 1,989,972 issued to Lewis L. Cunningham on May 22, 1935.

The proportioning motor 99 comprises a pair of rotors 280 and 281 mounted upon a shaft 283. Interposed between the shaft 283 and the proportioning motor shaft 270 is a gear train 284. Rotation of the shaft 283 under the action of rotor 280 or 281 therefore causes rotation of the shaft 270. Cooperating with the rotors 280 and 281 are field coils 285 and 286 respectively. The rotor 280 and field coil 285 comprise a motor for driving the shaft 270 in one direction while the rotor 281 and field coil 286 comprise a motor for driving the shaft 270 in the opposite direction. Also mounted upon the shaft 270 of the proportioning motor is a balancing arm 290 which is arranged to cooperate with a balancing resistance 291 to form a balancing potentiometer. When the valve 95 is completely closed the balancing arm 290 engages the extreme lower end of the balancing resistance 291 as shown. As the valve is opened, however, the arm 290 is moved upwardly across balancing resistance 291 and when the valve is completely opened arm 290 engages the extreme upper end of resistance 291.

Reference character 295 designates generally a balanced relay identical with the balanced relay 205 previously described. This relay comprises a U-shaped armature pivoted at 296 and having legs 297 and 298. Cooperating with the leg 297 is a relay coil 299 while a similar relay coil 300 cooperates with the leg 298. Secured to the armature by an insulating member 301 is a switch arm 302 which is adapted to cooperate with the contacts 303 and 304. When the relay coils 299 and 300 are equally energized the armature assumes the position shown, in which switch arm 302 is midway between the contacts 303 and 304. If, however, coil 299 is energized more highly than coil 300, switch arm 302 will engage contact 303 and if the coil 300 is energized more highly than coil 299, switch arm 302 will engage the contact 304.

Reference character 305 designates a step-down transformer, the primary of which is connected to the line wires 222 and 223. One side of the secondary 306 is connected by a wire 307 to the lower end of relay coil 299. A wire 308 connects the upper ends of the relay coils 299 and 300 while the lower end of relay coil 300 is connected by wires 309 and 310 to the other terminal of the transformer secondary 306. In this manner the relay coils 299 and 300 are connected in series across the terminals of the transformer secondary. A wire 311 is connected at one end to the junction of wires 309 and 310 and at its other end to a resistance 312, the other end of this resistance being connected by wires 313, 314 and 315 to one end of the balancing resistance 291 and to one end of the control resistance 108 of the return duct temperature controller 100. The other ends of the balancing resistance 291 and the control resistance 108 are connected by wires 316, 317, 318 and 319 to resistance 320. Resistance 320 in turn is connected by wires 321 and 322 to the transformer secondary and to the lower end of relay coil 299. In this manner the control resistance 108 and the balancing resistance 291 are connected in parallel across the terminals of the transformer secondary 306 along with the relay coils 299 and 300 which are serially connected across said transformer secondary. Connected to the junction 308 for the relay coils 299 and 300 is a wire 323 which joins the wire 324 leading to the balancing arm 290 of the balancing potentiometer. Wire 323 is also connected to a wire 325 leading to the mercury switch 124. A wire 326 leads from the wire 325 to the control arm 118 of the low limit controller 101. A wire 327 leads from the right end of the mercury switch 124 to the left end of the control resistance 119 of the low limit controller 101, and a wire 329 leads from the junction of the wire 327 and resistance 119 to the control arm 107 of the return duct controller 100. A wire 330 leads from the right-hand end of the control resistance 119 of the low limit controller to the left-hand end of the mercury switch 124, and a wire 331 leads from the same end of the mercury switch 124 to the junction of wires 318 and 319.

With the parts in the position shown, the apparatus is operating under a summer cycle. For convenience in description it will be assumed that the system is now operating on the heating cycle instead of the cooling cycle as illustrated in the drawings. Under this condition the mercury switch 124 will be tilted in the opposite direction due to the fact that the return air temperature is below 73° (the setting of controller 102). Also under the heating cycle the discharge duct temperature will be assumed to be higher than 63°. The control arm 118 of the low limit controller 100 will therefore engage the extreme left-hand end of control resistance 119 at this time. With this position of the control arm 118 the control arm 107 of the return duct controller 100 will be connected to the junction of the relay coils 299 and 300 by wires 308, 323, 325, 326, control arm 118 and wire 329. Also due to the wires 330 and 331 being connected through mercury switch 134, the right-hand end of control resistance 119 will be connected to the lower end of relay coil 299 by means of wires 330, mercury switch 124, wires 331 and 319, resistance 320 and wires 321, 322 and 307. As the control arm 118 is now engaging the extreme left-hand end of control resistance 119, the left-hand end of said resistance is connected by the control arm 118 to the junction of coils 299 and 300. Due to the right-hand end of said resistance being connected to the lower end of relay coil 299 as just described the resistance 119 will be connected entirely in parallel with the relay coil 299. To compensate for the unbalancing effect on the relay caused by the control resistance 119 being in parallel with the relay coil 299, a resistance 332 is shown as connected between wires 313 and 323. This resistance, it will be observed, is in parallel with the relay coil 300. Since this resistance is of equal value to that of resistance 119 there will be no unbalancing effect of the relay 295 due to the control arm 118 of the low limit controller 101 engaging the extreme left-hand end of the control resistance 119.

Assuming now that the return air duct temperature is 70°, the control arm 107 will be engaging the center of control resistance 108. Assuming also that for this condition the valve is half open and the balancing arm 290 is engaging the center of balancing resistance 291, the relay 295 will be balanced and the proportioning motor will be deenergized in this position. If now the return air temperature should increase, the control arm 107 will move towards the left across control resistance 108, this decreasing the portion of said control resistance in parallel with the relay coil 300 and increasing the portion of said resistance in parallel with relay coil 299. This will cause a greater current flow in relay coil 299 than occurs in the relay coil 300, this causing switch arm 302 to engage contact 303 thereby energizing the motor field 285 by a circuit as follows: transformer secondary 306, wire 322, wire 333, switch arm 302, contact 303, wire 334, motor field 285, wire 336 and wires 311 and 310 to transformer secondary 306. This will cause rotation of the motor shaft in a direction to close the steam valve 95, this moving the balancing arm 290 downwardly across the balancing resistance 291. This, in a manner which should now be apparent, acting to reduce the current flow in relay coil 299 and increase the current flow in coil 300. When the movement of the balancing arm is sufficient to neutralize the initial unbalancing action of control 100, the proportioning motor will stop with the valve in its new position. Conversely, upon fall in return air temperature the control arm 107 of the return duct controller will move in the opposite direction across control resistance 108, this having the effect of decreasing the current flow in relay coil 299 and increasing the current flow in relay coil 300, this causing switch arm 302 to engage contact 304 thereby energizing the motor field 286 as follows: transformer secondary 306, wire 322, wire 333, switch arm 302, contact 304, wire 337, motor field 286, and wires 336, 311 and 310 back to secondary 306. This action will cause movement of the valve towards open position and movement of the balancing arm 290 upwardly across balancing resistance 291, this having the effect of decreasing the current flow in the relay coil 300 and increasing the current flow in relay coil 299. When the movement of the balancing arm 290 is sufficient to neutralize the initial unbalancing action of controller 100 the relay 295 will again become balanced and the switch arm 302 will disengage contact 304 causing the proportioning motor to stop with the valve in this new position. In this manner the controller 100 will act to position the steam valve 95 in accordance with the temperature of the return air, this controller acting to cause an increase in steam flow to the reheating coil as the temperature decreases and to decrease the flow of steam as the return air temperature increases, and in this manner acts during the heating cycle to maintain the temperature of the return air between 69° and 71°.

With the return air temperature above 63° F. it will be reremberred the control arm 118 of low limit controller 101 engages the extreme left-hand end of the control resistance 119. With this position, as previously pointed out, the entire control resistance 119 is connected in parallel with the relay coil 299. If now should the delivery duct temperature fall below 63° F. the control arm 118 will be moved to the right across the control resistance 119. This will have the effect of placing part of the control resistance 119 in parallel with the relay coil 300 and consequently decreasing the portion of control resistance 119 which is in parallel with the relay coil 299. The effect of this will be to decrease the current flow in relay coil 299 and to increase the current flow in relay coil 300, this causing engagement of switch arm 302 with contact 304 to cause rotation of the proportioning motor shaft in a direction to open the valve. The balancing arm 290 during this valve opening movement will be moved upwardly across the balancing resistance 291, this decreasing the current flow in relay coil 300, and increasing the current flow in relay coil 299. When the movement of the balancing arm is sufficient to neutralize the unbalancing effect of low limit controller 119, the relay will become balanced, this causing stopping of the motor with the valve in this further opened position. It will be apparent that upon further fall in the delivery air temperature the control arm 118 of the low limit controller will move further across the control resistance this causing the steam valve 95 to be opened to a wider position. Thus when the temperature of the delivered air falls to 60° F. the valve will be caused to assume a complete wide open position irrespective of the temperature of the return air. The low limit controller 101 therefore acts to place the return air temperature controller 100 in full control of the steam valve whenever the delivered air temperature is above 63° F. As the delivered air temperature falls below this value, however, the low limit controller will progressively cause opening of the steam valve to offset or stop this falling in temperature. In this manner the low limit controller prevents delivery of air to the spaces 9 and 10 below 63° F. during the heating cycle, thereby avoiding chilling of the occupants by cold drafts.

During the cooling cycle it is necessary to deliver air to the spaces 9 and 10 below 63° F. in order to provide adequate cooling of the spaces during hot weather. It is therefore necessary on the cooling cycle to disconnect the low limit controller 101 so as to prevent turning on of the steam valve 95 by such controller. This is the function of the controller 102. As previously pointed out, this controller is set so as to assume the position shown when the return air temperature is above 73° F. and to assume the opposite position at lower temperatures. As under the heating cycle the return air temperature is below 73° F. and as during the cooling cycle the return air temperature is above this value, the controller 102 will automatically shift its position as the operation of the system changes from heating to cooling. Therefore, during the cooling cycle the controller 102 will assume the position shown. With the mercury switch 124 tilted as illustrated in the drawing the right-hand end of the control resistance 119 of the low limit controller will be disconnected from the relay 295. Also the control arm 107 of the return air temperature controller 100 will be directly connected to the junction wire 308 of the relay coils 299 and 300 by wires 323, 325, mercury switch 124, wire 327 and wire 329. Under this condition the return air temperature controller 100 will be placed in full control of the steam valve and the low limit controller will have no effect whatsoever due to the fact that the control resistance 119 is short-circuited through the mercury switch 124 and also due to the fact that the right-hand end of the control resistance 119 is disconnected from the relay 295 by the mercury switch 124. The delivery duct temperature may therefore fall below 60° F. without the low limit controller acting to cause opening of the steam valve. As under the cooling cycle the return air temperature will be above 71° F. the controller 100 will act to cause the valve to move to full closed position as illustrated in the drawing.

*Operation*

With the parts in the position shown, the outdoor temperature is approximately 88° F. as indicated by the control arm of the outdoor temperature controller assuming an intermediate position. Also the return air temperature is approximately 76° F. as indicated by the control arm 170 of the temperature controller 91 being in an intermediate position. The relative humidity within the spaces is approximately 50%, this causing the controller 92 to assume an intermediate position. Due to the intermediate positions of all of these controllers the proportioning motor 90 has moved the by-pass damper to a position midway between open and closed positions. Also the temperature of the air issuing from the spray is approximately 53° F. as indicated by the dew-point controller 35 assuming an intermediate position. This causes the three-way valve 22 to assume a position in which a mixture of cold water from the receiver 20 and return water from the trough 26 is supplied to the spray 3. With the parts in the position shown, therefore, the system is operating on the cooling cycle to maintain a temperature in the spaces 9 and 10 which is below outside temperature. As the system is operating on the cooling cycle the temperature of the delivered air is below 60° F. this causing the low limit controller 101 to assume an extreme position. However, as the return air temperature is above 73° F. the controller 102 has placed the low limit controller 101 out of operation, this permitting the temperature controller 100 to completely close the steam valve 95. Therefore, no steam is being supplied to the reheater 40. Also at this time the booster heater control valves 132 and 133 are completely closed by their respective temperature controllers 140 and 141 due to the temperature of the air within the spaces 9 and 10 being above the range of such temperature controllers. At this time also the steam valve 75 for the preheater 2 is completely closed due to the temperature of the air issuing from the spray being above the range of the controller 80. No heat whatsoever, therefore, is being supplied to the spaces 9 and 10 by the system and the system is operating under the control of the return air temperature controller 91 and the humidostat 92, these controllers acting to adjust the by-pass damper 13 in a manner to maintain a constant effective comfort temperature within the spaces 9 and 10, the value of this effective temperature being determined by the outside temperature controller 93.

If now should the outside temperature increase, the outside temperature controller, in a manner hereinbefore described, will cause the by-pass damper 13 to be moved towards open position, this having the effect of increasing the portion of the air by-passed around the cooling spray 3 and raising the control point of the controller 91. As the cooling load will increase due to this increase in outside temperature and as the cooling effect of the system has been decreased by the outside temperature controller, the return air temperature will begin to rise. This rising temperature will cause the controller 91 to gradually close the by-pass damper 13, this increasing the cooling effect of the system thereby acting to counteract the temperature rise. When the temperature rise has reached the new control point of the controller 91 as determined by the outside temperature controller 93, the closing movement of the damper 13 by the controller 91 will be sufficient to cause the cooling effect of the system to be equal to the cooling load, thereby preventing further increase in temperature within the spaces 9 and 10.

While the return air temperature controller 91 is moving the by-pass damper 13 towards closed position, as described in the preceding paragraph, the portion of the return air passed through the spray 3 will be increased, this increase in air flow causing the temperature of the air issuing from said spray to increase. This will cause the dew-point controller 35 to gradually cause movement of the three-way valve 22 in a direction to decrease the portion of re-circulated water and to increase the portion of the water withdrawn from the receiver 20 which is delivered to the spray. It will be seen, therefore, that as the cooling load upon the system increases due to increase in outside temperature the quantity of refrigerated water passed to the spray 3 will be increased, thereby increasing the cooling action of said spray. Due to the relatively wide range of the dew-point controller 35 this increase in the supply of refrigerated water passed to the spray 3 will not be sufficient to fully counteract the temperature rise of the air issuing from the spray. For instance, it will be seen that with the controller 35 in the position shown, a dew-point temperature of 53° F. is being maintained. In order to cause the portion of refrigerated water supplied to the spray to be increased the temperature at the bulb 45 must increase and before all refrigerated water is supplied to the spray 3 the temperature of the air issuing from the spray must have risen from the 53° F. to 56° F. It should therefore be apparent that as the refrigerating load increases the dew-point temperature of the air issuing from the spray will be allowed to increase by the controller 36. This will result in a higher humidity occurring within the spaces 9 and 10 at this time. This action is desirable for as the outside temperature increases it is desired, as hereinbefore pointed out, to raise the effective temperature maintained within the spaces 9 and 10 to avoid shock to persons entering the spaces from outside. Due to this decrease in dehumidifying action caused by raising the dew-point of the air issuing from the spray, the humidity within the spaces will be raised as well as the temperature to effect this desired rise in effective temperature.

Should the outside temperature now fall the outside temperature controller 93 will in effect lower the control point of the controller 91, this causing the by-pass damper 13 to be moved further to open position. As upon falling outside temperature the cooling load will decrease and as the cooling effect of the system has been increased due to the lowering of the control point of controller 93, the return air temperature will begin to fall. As this return air temperature falls the controller 91 will act to gradually increase the opening of the by-pass damper 13 thereby decreasing the portion of the return air passed through the cooling spray and increasing the portion of such air by-passed around this spray. When the return air temperature falls to the new control point of the controller 91 the opening of the by-pass damper 13 will be sufficient to reduce the cooling effect of the system enough to prevent further fall in temperature. The temperature controller 91 and the humidity controller 92 will then act to maintain this new standard of effective temperature within the spaces 9 and 10.

While the by-pass damper 13 is moved towards open position, as described in the preceding paragraph, the air flow through the spray 3 will decrease, this causing the temperature of the air issuing from the spray to decrease which results in causing the dew-point controller 35 to adjust the three-way valve 22 to decrease the portion of cold water supplied from the receiver 21 to the spray 3. Due to the wide range of the controller 35 this decrease in refrigerated water supplied to the spray will not fully compensate for the decrease in temperature of the air issuing from the spray. Therefore, as the outdoor temperature decreases the cooling load upon the system will decrease, this eventually resulting in the controller 91 increasing the opening of the by-pass damper 13, this resulting in a reduction in the air flow through the spray 3, this reduction in air flow causing the temperature of the air issuing from the spray to fall due to the fact that the wide range dew-point controller 35 will not reduce the flow of refrigerated water sufficiently to compensate for the decrease in air flow through the spray. This decrease will cause a reduction in humidity within the spaces at this time, thereby causing the desired reduction in effective temperature to be comprised of a reduction in humidity as well as a reduction in temperature.

As the outdoor temperature continues to fall the cooling effect of the system in the manner described will continue to be decreased and when the outside temperature falls to, say, 76° F. the control point of the indoor controller 91 will be shifted to maintain an indoor temperature of 72°. At this time the by-pass damper 13 will be almost completely open, this causing but a small portion of the air to be passed through the spray 3. Very little cooling effect will thus be required and consequently the controller 35 will cause the three-way valve 22 to assume a position in which substantially all of the water supplied to the spray is re-circulated water. At this time also the dew-point temperature maintained by the controller 35 will be at a minimum, for instance 50° F. As the outside temperature continues to fall the inside temperature will fall due to the decrease in cooling load and as it approaches 70° F. the by-pass damper 13 will be moved to wide open position so that a minimum amount of air is passed through the spray 3. At this time the controller 35 will stop entirely the flow of refrigerated water to the spray 3, this resulting in the temperature of the water within the receiver 20 falling below the setting of the controller 65, this placing the refrigerating system out of operation. It should therefore be apparent that when the outside temperature falls sufficiently to result in the inside temperature falling below 72° F. the cooling system will be placed completely out of operation.

At this time the controller 102 will have placed the low limit controller 101 in operation thereby preventing delivery of air to the spaces 9 and 10 below 60° F. As the outside temperature continues to fall the temperature within the spaces 9 and 10 will fall, this resulting in the return air temperature dropping. When the return air temperature begins dropping below 71° F. the return air temperature controller 100 will begin gradually opening the steam valve 95 to supply heat to the spaces 9 and 10. As hereinbefore pointed out, when the steam valve 95 begins to open the auxiliary switch 272 will be actuated, this causing the by-pass damper 13 to be completely closed thereby causing all of the return air to be passed through the spray. Upon further decrease in outside temperature the heat loss from the spaces 9 and 10 will increase, this having the tendency of reducing the temperature of the air returning from said spaces, this reduction in temperature acting upon the temperature controller 100 to increase the supply of steam to the heater 4 thereby increasing the amount of heat supplied to the spaces. It will therefore be seen that as the heating load increases the supply of steam to the reheater 4 will be increased correspondingly. Due to the controller 100 being responsive to the return air temperature which is a mixture of the air drawn from both spaces, the supply of steam to the reheater will be controlled in accordance with the average temperature of the spaces 9 and 10. At this time the controllers 140 and 141 in the spaces 9 and 10 will act to supply proper amounts of steam to the booster heaters 130 and 131 in order to maintain proper temperatures within each zone. By the use of these individually controlled booster heaters the temperature in each zone is maintained constant even though the heating load of said spaces may vary relatively to each other.

It will be remembered that during the heating cycle the by-pass damper 13 is completely closed due to the steam valve 95 being open. The spray at this time will therefore act to humidify the air being passed through to the spaces 9 and 10. In order to maintain proper relative humidity within the spaces 9 and 10 the temperature of the air issuing from the spray is maintained in the neighborhood of 40° F. Due to the air issuing from the spray being in a saturated condition this 40° F. will thus be the dew-point temperature of the air. When this air is discharged into the spaces 9 and 10 in which the temperature is maintained at approximately 70° F., this relative humidity will be approximately 35%, which is desirable. This dew-point temperature of approximately 40° F. is maintained by the dew-point temperature controller 80 which controls the supply of steam to the reheater 2. Thus as the dew-point temperature falls the steam supply valve 78 is opened to supply more steam to the reheater thereby maintaining the dew-point temperature at its proper value.

From the foregoing it should be apparent that I have provided an air conditioning system for year-around operation, this system acting in summer to maintain an effective temperature within the spaces 9 and 10 which is varied in accordance with changes in outside temperature. It should further be apparent that the system is entirely automatic, changing from summer cooling operation to winter heating operation without any manual adjustments whatsoever. While for purposes of description I have assumed specific values of temperature and other conditions for the various controllers, it will be apparent that these values may be varied as desired for each individual installation. It will also be apparent that while I have shown the system as conditioning but two separate zones, the system may be employed for conditioning as many zones as desired, and if desired, may be used for conditioning but a single zone. Many other changes which are within the scope of my invention will suggest themselves to those skilled in the art and I therefore desire to be limited only by the scope of the appended claims and the prior art.

I claim as my invention:

1. In an air conditioning system, in combination, a conditioning chamber having an inlet and an outlet, duct means connecting said outlet with a space to be conditioned, condition changing means for changing the heat content of the air passing through said chamber, by-pass means for by-passing a portion of the air around said condition changing means and mixing it with the conditioned portion, damper means for controlling the relative proportions of the by-passed air and the conditioned air, motor means for positioning said damper means, air condition responsive means in control of said motor means, a second condition changing means for changing the heat content of the air, means for placing said second condition changing means into and out of operation, and automatic means for closing said by-pass when said second condition changing means is placed into operation.

2. In an air conditioning system, in combination, a conditioning chamber, means connecting said chamber with a space to be conditioned, a first conditioning means in said chamber for changing the heat content of the air, a second conditioning means in said chamber for changing the heat content of the air, a by-pass around said first conditioning means, damper means for controlling the relative proportions of the air passed through said first conditioning means and said by-pass, condition responsive means for controlling said first and second conditioning means and said damper means, and means for moving said damper means to an extreme position when said second conditioning means is actuated from an extreme condition of operation.

3. In an air conditioning system, in combination, a conditioning chamber having an inlet and an outlet, duct means connecting said outlet with a space to be conditioned, means for reducing the heat content of the air passing through said chamber, by-pass means for by-passing a portion of the air around said heat content reducing means and mixing it with the conditioned portion, damper means for controlling the relative proportions of the by-passed air and the conditioned air, motor means for positioning said damper means, means responsive to the temperature of the air in said space for controlling said motor means, means for heating the air, thermostatic means responsive to said space temperature for controlling said heating means, and means actuated by said thermostatic means additionally controlling said motor means.

4. In an air conditioning system, in combination, a conditioning chamber having an inlet and an outlet, duct means connecting said outlet with a space to be conditioned, means for reducing the heat content of the air passing through said chamber, by-pass means for by-passing a portion of the air around said heat content reducing means and mixing it with the conditioned portion, damper means for controlling the relative proportions of the by-passed air and the conditioned air, motor means for positioning said damper means, means responsive to the temperature of the air in said space for controlling said motor means to increase the proportion of the air by-passed as the space temperature falls, means for heating the air, means for placing said heating means into operation when the space temperature falls to a predetermined value, and automatic means for closing said by-pass when said heating means is placed into operation.

5. In an air conditioning system, in combination, a conditioning chamber having an inlet and an outlet, duct means connecting said outlet with a space to be conditioned, condition changing means for changing the heat content of the air passing through said conditioner, by-pass means for by-passing a portion of the air around said condition changing means and mixing it with the portion passed through said condition changing means, damper means for controlling the flow of air through said by-pass means and said condition changing means, motor means for positioning said damper means, temperature varying means for varying the temperature of said air mixture, means responsive to space temperature for controlling said motor means and said second temperature varying means, and means for moving said damper means to an extreme position when said temperature varying means is placed into operation.

6. In an air conditioning system, in combination, a conditioning chamber having an inlet and an outlet, duct means connecting said outlet with a space to be conditioned, means for spraying water into the air passing through said conditioner, by-pass means for by-passing a portion of the air around said spray means and mixing it with the sprayed portion, damper means for controlling the relative proportion of the by-passed air and the sprayed air, motor means for positioning said damper means, condition changing means downstream of said spray and by-pass means for changing the heat content of the air mixture, air condition responsive means in control of said damper motor means and said condition changing means, and means for causing said damper motor means to move to an extreme position when said condition changing means is placed into operation.

7. In an air conditioning system, in combination, a conditioning chamber having an inlet and an outlet, duct means connecting said outlet with a space to be conditioned, means for spraying water into the air passing through said conditioner, by-pass means for by-passing a portion of the air around said spray means and mixing it with the sprayed portion, damper means for controlling the relative proportion of the by-passed air and the sprayed air, damper motor means for positioning said damper means, heating means downstream of said spray and by-pass means to thereby increase the temperature of the air mixture, temperature responsive means in control of said damper motor means and said temperature changing means, said temperature responsive means acting to progressively cause opening of said by-pass as the space temperature falls and to place said heating means into operation when the space temperature falls to a still lower value, and means for closing said by-pass when said heating means is placed into operation.

8. In an air conditioning system, in combination, a conditioning chamber having an inlet and an outlet, supply duct means connecting said outlet to a space to be conditioned, dew-point control means in said conditioning chamber for maintaining a constant dew-point temperature of the air passing therethrough, by-pass means around said means last mentioned, temperature changing means for the air discharged from said dew-point temperature control means and said by-pass means, and temperature responsive means for controlling said temperature changing means and said by-pass means in a manner to close the by-pass means and place said temperature changing means in operation.

9. In a system of the class described, in combination, a first controller, a second controller, condition responsive means for operating said controllers, said means acting to progressively move one of said controllers from one extreme position to the other as said condition varies, and to begin moving the other controller from an extreme position as said condition varies further in the same direction, and means for moving said first controller to its opposite extreme position when said second controller is moved from the extreme position above mentioned.

10. In a system of the class described, in combination, a first controller, a second controller, condition responsive means for operating said controllers, said means acting to operate one of said controllers for one range of values of said condition, and to operate the other of said controllers for a different range of such values, and means for moving one of such controllers to an opposite position when the other controller is actuated by said condition responsive means.

11. In an air conditioning system, in combination, a conditioning chamber having an inlet and outlet, duct means connecting said chamber with a space to be conditioned, means for spraying water into the air passing through said chamber, cooling means for chilling said spray water, mixing valve means for controlling the temperature of said spray water, air heating means in said conditioning chamber on the upstream side of said spraying means for heating the air before it passes through said spray means, thermostatic means responsive to the temperature of the air on the downstream side of said spray means for controlling the temperature of said spray water, said thermostatic means including motor means for positioning said mixing valves in a manner to reduce the cooling effect of said cooling means on said spray water progressively as said temperature decreases, switching means actuated by said motor means to shut down said cooling means when the air temperature falls to a predetermined value, a second thermostatic means responsive to the temperature of the air on the downstream side of said spray means, said second thermostatic means acting to place said heating means into operation when the temperature of said sprayed air falls to a value lower than the value at which said first thermostatic means acts to shut down said cooling means, said second thermostatic means acting also to progressively increase the supply of heating fluid to said heating means as said air temperature continues to fall.

12. In an air conditioning system, in combination, a conditioning chamber having an inlet and outlet, discharge duct means connecting said outlet with a space to be conditioned, heating and cooling devices in said conditioning chamber, temperature responsive means controlling said heating and cooling means, thermostatic limit control means responsive to the temperature of the conditioned air for preventing said temperature from falling below a predetermined value, and thermostatic means for rendering said limit control means ineffective when said space temperature is above a predetermined value.

13. In an air conditioning system, in combination, a discharge duct for conveying air to a space to be conditioned, heating means for heating the air flowing through said discharge duct, cooling means for cooling the air flowing through said discharge duct, a thermostat responsive to the temperature in said space for controlling the heating means in a manner tending to maintain the space temperature constant, thermostatic limit control means responsive to the temperature of the air in said discharge duct for placing said heating means into operation independently of said space thermostat for preventing the temperature of the air in the discharge duct from falling below a predetermined value, means for placing said cooling means into operation upon demand for cooling, and means also actuated upon demand for cooling for preventing said limit control means from maintaining the air temperature in said discharge duct above said predetermined value.

14. In an air conditioning system, in combination, a discharge duct for conveying air to a space to be conditioned, heating means for heating the air flowing through said discharge duct, a reversible electric motor for controlling said heating means, said motor having a control circuit, a first thermostatic switch, electric current controlling means responsive to space temperature and connected into said control circuit for causing said motor to assume various intermediate positions in a manner to maintain the temperature in the space substantially constant, a second thermostatic electric current controlling means responsive to the temperature of the air discharged to said space and connected into said control circuit in a manner to prevent the temperature of the discharge air from falling below a predetermined value irrespective of said first current controlling means, cooling means for cooling the air in said discharge duct, thermostatic means for placing said cooling means into operation upon demand for cooling, switching means connected into said control circuit, said switching means having a first position wherein said second current controlling means is rendered effective to prevent the temperature of the discharge air from falling below a predetermined value and having a second position wherein said second current controlling means is rendered ineffective to prevent fall in temperature below said predetermined value, and means for causing said switching means to be at its second position when the cooling means is in operation.

JOHN E. HAINES.